(12) United States Patent
Eckhardt et al.

(10) Patent No.: US 10,467,174 B2
(45) Date of Patent: Nov. 5, 2019

(54) SYSTEM AND METHOD OF MONITORING DATA TRAFFIC ON A MIL-STD-1553 DATA BUS

(71) Applicant: THE BOEING COMPANY, Chicago, IL (US)

(72) Inventors: Josh D. Eckhardt, St. Peters, MO (US); Thomas E. Donofrio, Naugatuck, CT (US); Khaled Serag, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 15/493,022

(22) Filed: Apr. 20, 2017

(65) Prior Publication Data

US 2018/0307645 A1  Oct. 25, 2018

(51) Int. Cl.
| | |
|---|---|
| H04L 12/40 | (2006.01) |
| G06F 13/42 | (2006.01) |
| G06F 13/36 | (2006.01) |
| G06F 13/40 | (2006.01) |

(52) U.S. Cl.
CPC ............ *G06F 13/42* (2013.01); *G06F 13/36* (2013.01); *G06F 13/4022* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 5,093,910 A | 3/1992 | Tulpule et al. | |
| 5,471,462 A | 11/1995 | Amador | |
| 5,479,610 A | 12/1995 | Roll-Mecak et al. | |
| 6,212,224 B1 * | 4/2001 | Cammarota | H04L 25/026 375/219 |
| 6,598,828 B2 * | 7/2003 | Fiebick | F41G 7/007 244/117 R |
| 6,633,832 B1 | 10/2003 | Browen | |
| 8,185,944 B2 | 5/2012 | Schnackenberg et al. | |

(Continued)

FOREIGN PATENT DOCUMENTS

EP    2 892 199 A1    8/2015

OTHER PUBLICATIONS

Extended European Search Report, Application 18 155 459.3-1216, dated Mar. 26, 2018.

*Primary Examiner* — Elias Mamo
(74) *Attorney, Agent, or Firm* — Toler Law Group, PC

(57) ABSTRACT

A system and method for monitoring data traffic on a MIL-STD-1553 data bus system with a data guard. The monitoring system includes a data guard, which may be toggled between a passive mode and an active mode using two switches. In the active mode, using a first switch, data traffic from remote terminals on the MIL-STD-1553 data bus system are placed on a guarded bus of the data guard system and sent to the data guard by way of a coupler for filtering data messages through a plurality of pre-generated data set rules. If the data traffic is validated, it is returned to the MIL-STD-1553 data bus system through a second coupler. In the passive mode, the data traffic is directed to a transparent bus by way of a third coupler using a second switch, thus allowing the MIL-STD-1553 data bus system to operate without latency concerns.

20 Claims, 9 Drawing Sheets

(56) References Cited

U.S. PATENT DOCUMENTS

| | | | |
|---|---|---|---|
| 8,286,231 B2 * | 10/2012 | Arnold | H04L 63/30 370/401 |
| 8,379,270 B2 | 2/2013 | Tomomatsu | |
| 8,739,270 B1 | 5/2014 | Arnold | |
| 9,071,357 B1 | 6/2015 | Shi et al. | |
| 10,127,127 B2 | 11/2018 | Dashtipour et al. | |
| 2004/0078714 A1 | 4/2004 | Hentsch | |
| 2005/0148327 A1 | 11/2005 | Perez et al. | |
| 2006/0101184 A1 | 5/2006 | Hegarty | |
| 2006/0112119 A1 | 5/2006 | Vian et al. | |
| 2007/0110053 A1 | 5/2007 | Soni et al. | |
| 2007/0160075 A1 * | 7/2007 | Carpassi | H04L 12/40032 370/451 |
| 2007/0204337 A1 * | 8/2007 | Schnackenberg | H04L 63/0227 726/11 |
| 2007/0230542 A1 * | 10/2007 | Okada | H04B 3/36 375/146 |
| 2007/0239923 A1 | 10/2007 | Weber | |
| 2008/0059954 A1 | 3/2008 | Martin | |
| 2009/0132748 A1 | 5/2009 | Sheffield | |
| 2010/0192217 A1 | 7/2010 | Arnold | |
| 2011/0314231 A1 | 12/2011 | O'Connor | |
| 2012/0095663 A1 | 4/2012 | Roy et al. | |
| 2012/0226839 A1 | 9/2012 | Fuoco et al. | |
| 2013/0212207 A1 | 8/2013 | Ong | |
| 2014/0136589 A1 | 5/2014 | Wahler | |
| 2014/0380433 A1 | 12/2014 | Yerger et al. | |
| 2015/0020152 A1 * | 1/2015 | Litichever | H04L 63/14 726/1 |
| 2015/0186234 A1 | 7/2015 | Hofman | |
| 2015/0270985 A1 | 9/2015 | Sheffield et al. | |
| 2017/0104790 A1 | 4/2017 | Meyers et al. | |
| 2018/0004948 A1 | 1/2018 | Martin et al. | |
| 2018/0025557 A1 | 1/2018 | Steinert | |
| 2018/0144139 A1 | 5/2018 | Cheng et al. | |
| 2018/0285300 A1 | 10/2018 | Prentice | |
| 2018/0285309 A1 | 10/2018 | Prentice | |
| 2018/0295148 A1 | 10/2018 | Mayorgo | |
| 2018/0307645 A1 | 10/2018 | Eckhardt et al. | |
| 2018/0307845 A1 | 10/2018 | Eckhardt et al. | |
| 2018/0367553 A1 | 12/2018 | Hayden et al. | |
| 2019/0052658 A1 | 2/2019 | Clarke et al. | |
| 2019/0098028 A1 | 3/2019 | Ektare et al. | |
| 2019/0205986 A1 | 7/2019 | Friedman | |

* cited by examiner

| GUARD SETTINGS 402 | MAIN RT 404 | RTs 406 | BUS MONITOR 408 | GUARD MONITOR 410 | FORCED MESSAGE AUDIT 412 | DATA CAPTURE 414 | ALLOW GOOD MESSAGE AUDIT 416 |
|---|---|---|---|---|---|---|---|
| Guard1 | | | | | | | |
| Guard2 | | | | | | | |

| 1ST SECTION 602 | | 2ND SECTION 606 | | | | First RT Command 622 | | | Second RT Command 624 | | | 3RD SECTION 608 | | 4TH SECTION 610 | | | | |
|---|---|---|---|---|---|---|---|---|---|---|---|---|---|---|---|---|---|---|
| RULE # 604 | LG 614 | DIREC-TION 616 | COM-MAND WORD TYPE 618 | TL (RULE) 620 | RT 626 | T/R 628 | SB 630 | WC 632 | RT 634 | T/R 636 | SB 638 | WC 640 | AUDIT AT 4TH SECTION VIOLA-TIONS 648 | AUDIT DATA CAP-TURE 650 | FIFO 652 | TYPE 654 | EXPIRA-TION 656 | UPDATE 658 | DEEP INSPECTION 660 |
| | | | | | | | | | | | | | | | | | | | YES/NO 662 | VALUES 664 |
| 1 611 | | | | | | | | | | | | | | | | | | | |
| 2 612 | | | | | | | | | | | | | | | | | | | |
| 3 613 | | | | | | | | | | | | | | | | | | | |

FIG. 6

SYSTEM AND METHOD OF MONITORING DATA TRAFFIC ON A MIL-STD-1553 DATA BUS

CROSS-REFERENCE TO RELATED APPLICATIONS

This application is related to U.S. Nonprovisional patent application Ser. No. 15/492,329, filed on Apr. 20, 2017, entitled "Bus Data Monitor," by inventors Josh D. Eckhardt, Thomas E. Donofrio, and Khaled Serag, and U.S. Nonprovisional patent application Ser. No. 15/492,426, filed on Apr. 20, 2017, entitled "Multiple Security Level Monitor For Monitoring A Plurality Of MIL-STD-1553 Buses With Multiple Independent Levels Of Security," by inventors Josh D. Eckhardt, Thomas E. Donofrio, and Khaled Serag, which applications are each incorporated in their entirety in this application by this reference.

BACKGROUND

1. Technical Field

The present disclosure generally relates to MIL-STD-1553 data bus systems and, more particularly, to a system and method of monitoring data traffic on an MIL-STD-1553 data bus system with a configurable data guard.

BACKGROUND OF THE INVENTION

MIL-STD-1553 is a military standard published by the United States Department of Defense that defines the mechanical, electrical, and functional characteristics of a serial data bus. The MIL-STD-1553 data bus ("1553 data bus") was originally designed as an avionics data bus for use with military avionics, but has also become commonly used in spacecraft on-board data handling ("OBDH") sub-systems, both military and civil. The 1553 data bus features multiple redundant balanced line physical layers, a network interface, time division multiplexing, half-duplex command/response protocol, and can handle up to 30 remote terminals ("RTs") devices. The 1553 data bus may include a bus controller ("BC") controlling multiple RTs that are all connected together by a data bus providing a single data path between the BC and all the associated RTs. The BC controls all of the activities on the data bus because only the active BC may originate and transmit command words on the 1553 data bus. While several RTs may be capable of performing as a bus controller, only one bus controller may be active at any one time. The 1553 data bus system may also include a bus monitor that cannot transmit messages over the 1553 data bus and has the primary role of monitoring and recording the data bus transactions without interfering with the operations of the BC or the RTs.

The primary purpose of the 1553 data bus is to provide a common medium for the exchange of data between systems and sub-systems on the 1553 data bus in the form of message transmissions. The 1553 standard defines different types of message transmission formats based on three word types: command words, data words, and status words. The 1553 standard also defines the criteria for the validation of message transmissions, such as valid sync, Manchester encoding, number of bits, odd parity, etc. The 1553 standard, however, does not validate the data being transmitted, which is the responsibility of each of the sub-systems connected to the 1553 data bus.

This responsibility may be provided by data guards that lie directly between an endpoint of a 1553 data bus system and the other sub-systems on the 1553 data bus system. However, if a data guard is always active for a remote terminal, this will create latency concerns in the 1553 data bus system (because of the additional response time required for a remote terminal to transmit its status word in response to a command word from a BC) and may be too restrictive for normal operations and only considered acceptable in the presence of known or suspected threats. Accordingly, there is a need for a data guard compatible with a 1553 data bus system that can be initialized and activated at any point in its operational lifecycle and that may be deactivated and reactivated at will by an operator of the 1553 data bus system.

SUMMARY

A data guard system for use with an MIL-STD-1553 data bus ("1553 data bus") is disclosed. The data guard system includes two switches, three couplers, a transparent bus, a guarded bus, and a data guard device, wherein the data guard device may be connected to the main bus of the 1553 data bus through the transparent bus and the guarded bus using the couplers. Using the two switches, the data guard system may be toggled between a passive mode and an active mode.

In the passive mode, using the first switch and the second switch, 1553 messages from a protected remote terminal (RT) may be directed by way of the second switch to the first coupler onto the transparent bus and then by way of the first switch to the third coupler connected to a bus repeater inserted in the main bus of the 1553 data bus. Thus, in the passive mode, 1553 messages from the protected RT bypass the data guard device and pass through directly to the main bus of the 1553 data bus. The data guard system also includes a monitor terminal (MT) connected to the third coupler, which acts as a passive device that collects all or a selected portion of the data directed to the transparent bus, and is also configured to receive toggle signals.

In the active mode, data from the protected RT is directed by way of the second switch onto the guarded bus and then to the second coupler, which is connected to two 1553 controllers of the data guard device. The data guard system includes three 1553 controllers to execute operations of 1553 messages: 1553 Controller A, 1553 Controller B, and 1553 Controller C. 1553 Controller C is configured to load 1553 messages from the guarded bus directly into memory blocks of the data guard device related to RT-RT messages, while 1553 Controller B is configured to load data from the guarded bus directly into memory blocks of the data guard device related to BC-RT and RT-BC messages, i.e., receive commands and transmit messages, respectively. A third controller, 1553 Controller A, directs 1553 messages to and from the 1553 data bus by way of the first coupler connected to the 1553 data bus.

As for the data guard device, in addition to the three aforementioned 1553 controllers, the data guard device may include a microprocessor (or CPU—the central processing unit), a filter, a plurality of blocks of Direct Memory Access (DMA) memory fields, and a computer-readable medium. The computer-readable medium includes encoded thereon computer-executable instructions that cause, when the data guard system is in the active mode, either the 1553 Controller B or the 1553 Controller C to execute a copy operation of a 1553 command message on the guarded bus directly into to a pre-designated memory block of the plurality of memory blocks of the data guard device, whereupon the CPU will cause the 1553 messages to be passed through the filter.

The filter includes a set of pre-defined data rule sets, which may be configured for each data guard using a Graphical User Interface (GUI) tool, where there may be one or more data guards in each data guard system. Each data guard may be configured for a particular threat level (TL) or range of TLs, and each TL may have its own set of data rule sets that include a plurality of pre-defined sub-rules. The data rule sets may be in form of a table comprising parameters of message type, message direction, first command address and second command address sub-fields, audit, data capture, and caching sub-fields. The data rule set may also provide for deep inspection of the data content of data words using values input by way of the GUI tool, where these values may replace values in the data words or may be used to validate certain data in the data words, such as a range of values received from sensors of, for example, an aircraft or other vehicle.

Using the data rule sets, a microprocessor (or CPU) of the data guard compares the 1553 messages received from the 1553 data bus against the data rule set to determine if a received 1553 message matches any one of the pre-defined sub-rules of the data rule set. Once a match is made, the filter may then monitor for invalid or illegal command words, unauthorized data transfers, and other low level attacks on the data bus structure, and may also perform a deep inspection of the data content of a data word. Once the 1553 messages have been compared against the data rule sets and evaluated by the filter, these 1553 messages may then be put back on the 1553 data bus by way of the first coupler to the bus repeater or to a protected RT by way of the second coupler onto the guarded bus and thence through the second switch. If there is no match between a command word and at least one data rule of the data rule set, the data guard may disallow or block the 1553 message, and dependent on certain values input into the data guard through the GUI tool, the data guard may also audit disallowed messages or optionally all messages, and also capture data from the 1553 messages. Each data guard may be configured to generate error messages notifying an operator of the types of errors and rule violations.

In an example of operation, the data guard system performs a method that includes monitoring data traffic on a 1553 data bus in a passive mode, receiving a signal from a bus controller to switch to an active mode, setting two switches so that the data traffic from the 1553 data bus is directed onto a guarded bus of the data guard system, where the guarded bus is connected to controllers of the data guard, and where a microprocessor accesses a data rule set from a computer file stored on a computer-readable medium of the date guard to evaluate the 1553 messages of the data traffic, and once the data traffic is evaluated and validated, either returning the data traffic to the 1553 data bus, blocking the 1553 messages, monitoring and/or capturing 1553 messages and data, and as well generating error messages for transmission to an operator of the data guard system.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The present disclosure may be better understood by referring to the following figures. The components in the figures are not necessarily to scale, emphasis instead being placed upon illustrating the principles of this disclosure. In the figures, like reference numerals designate corresponding parts throughout the different views.

FIG. 4 shows a schematic diagram of an example of an implementation of a table containing data settings for each data guard of a data guard system in accordance the present disclosure.

FIG. 6 shows a schematic diagram of an example of an implementation of a table containing data rule sets for each data guard of a data guard system in accordance the present disclosure.

DETAILED DESCRIPTION

Figure 1:
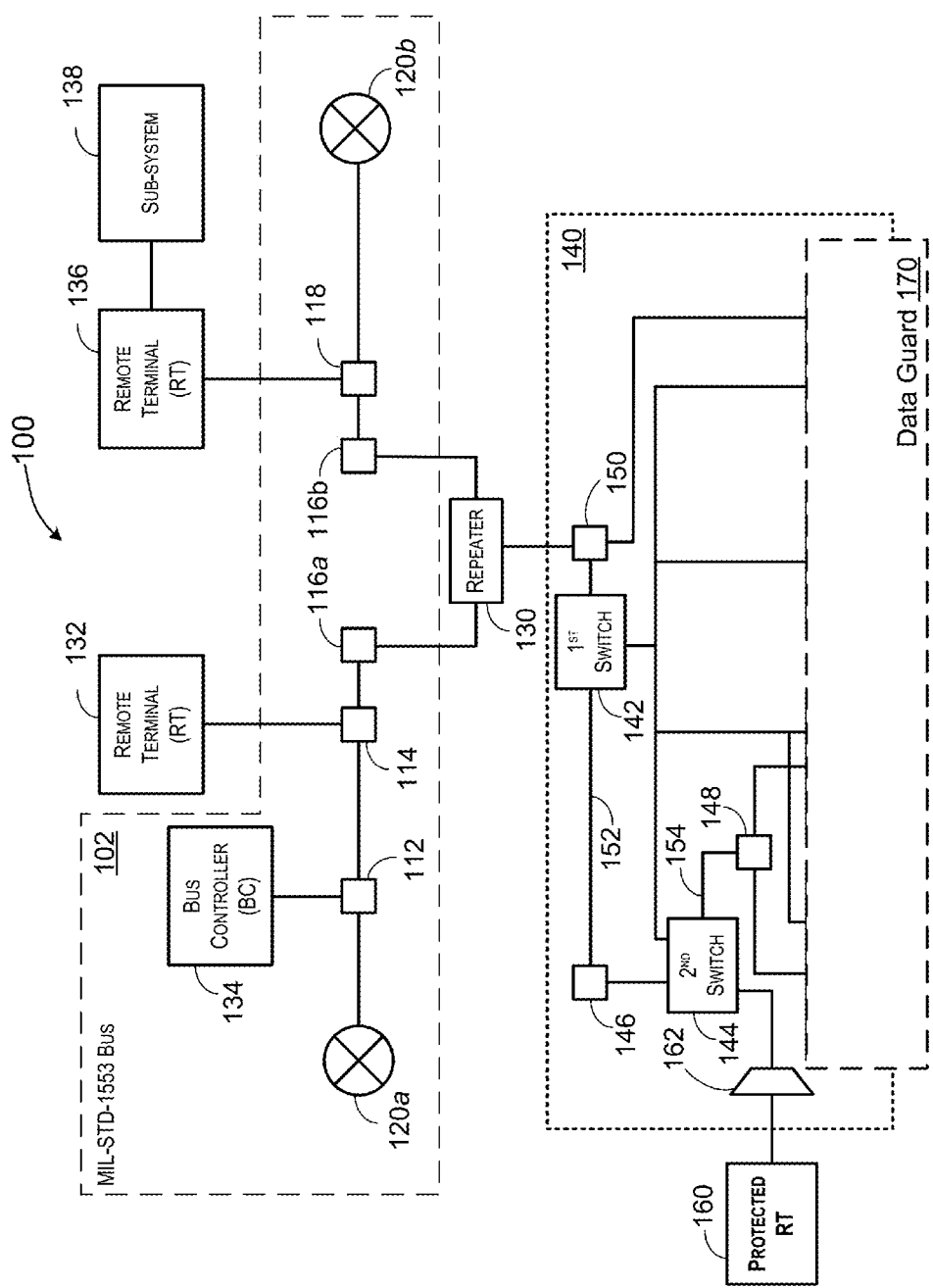
FIG. 1 shows a block diagram of an example of an implementation of a data guard system in accordance the present disclosure, inserted into a conventional MIL-STD-1553 data bus.

A system and a method for monitoring data traffic on a MIL-STD-1553 data bus system 100 with a data guard are provided. FIG. 1 shows a block diagram of an example of a data guard system in accordance the present disclosure, inserted into a conventional MIL-STD-1553 data bus. In FIG. 1, a conventional MIL-STD-1553 data bus 102 is shown, with resistance terminators 120a and 120b defining endpoints of the MIL-STD-1553 data bus 102. Shown connected to the MIL-STD-1553 data bus 102 are bus controller 134, remote terminal (RT) 132, and RT 136, connected to the MIL-STD-1553 data bus 102 by way of couplers 112, 114, and 118, respectively. These couplers may be either direct couplers or transformer couplers, the former used for shorter stubs and the latter for longer stubs, up to a maximum of twenty feet. Sub-system 138 is any sub-system that can be connected to an RT, such as, for example, a payload device, navigation system, communications system, radar system, weapons system, inertial sensors, etc.

Triaxial connectors 116a and 116b form a gap that allows insertion of a bus repeater 130 into the MIL-STD-1553 data bus 102. The bus repeater 130 provides a connection between the MIL-STD-1553 data bus 102 and a data guard system 140 in accordance with the present disclosure. The data guard system 140 includes two switches, first switch 142 and second switch 144, which can be toggled to change the operation of the data guard system 140 back and forth between a passive mode and an active mode.

The data guard system 140 also includes three couplers, first coupler 146, second coupler 148, and third coupler 150. In general, these couplers are in signal communication with 1553 controllers (not shown) of the data guard 170. For example, in one embodiment, second switch 144 connects a protected RT 160 to the data guard 170 by way of a triaxial connector 162 and second coupler 148 such that data traffic from the protected RT 160 is directed onto a guarded bus 154 in signal communication with the data guard 170, where the data traffic will be evaluated and authorized by a filter (not shown) of the data guard 170. If second switch 144 is toggled, which may be triggered by bus controller ("BC") 134, the data traffic will flow onto a transparent bus 152 by way of first coupler 146 and thence to MIL-STD-1553 data bus 102 by way of the third coupler 150 and the bus repeater 130.

Figure 2A:
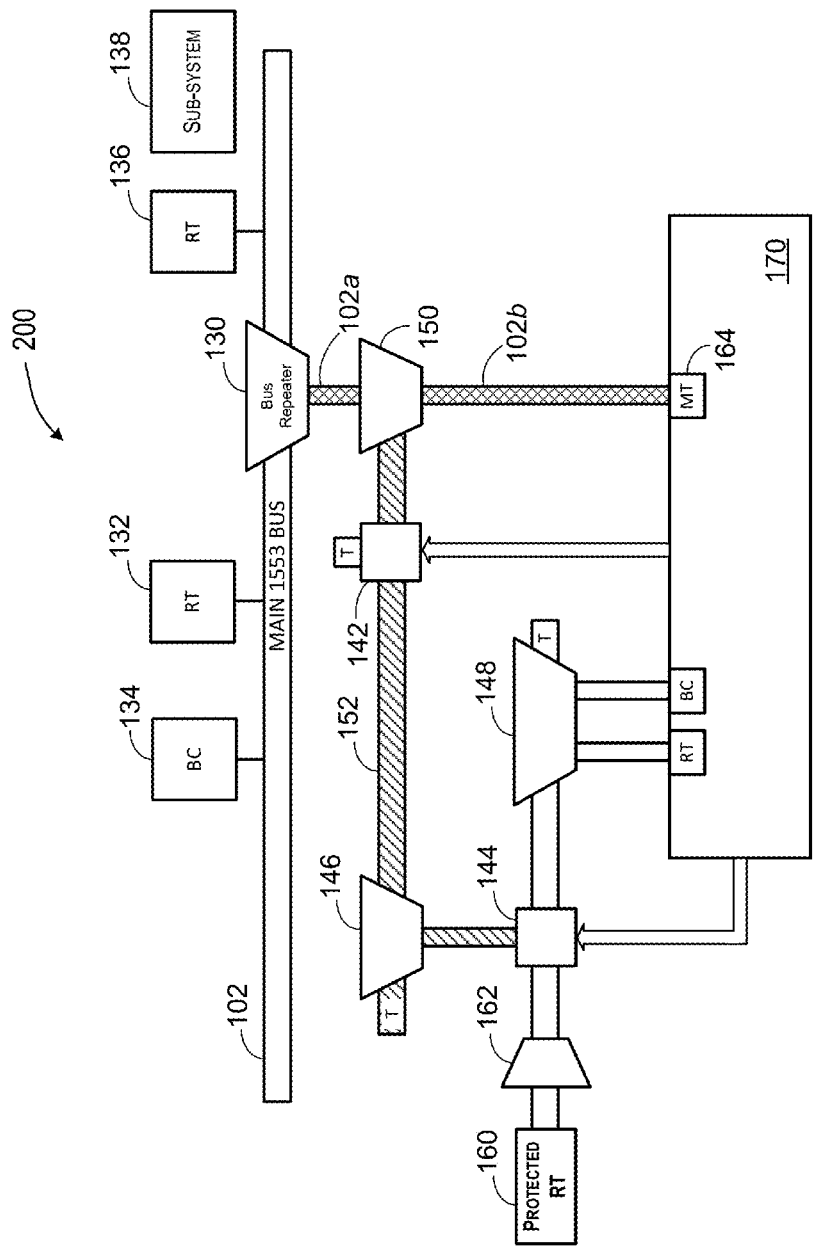
FIG. 2A shows a simplified block diagram of the data guard system of FIG. 1A in the passive mode.

Turning to FIG. 2A, a simplified block diagram of the data guard system of FIG. 1 in the passive mode is shown. In FIG. 2A, protected RT 160, which may include other RTs protected by the same data guard, is connected to the data guard system 200 by way of triaxial connector 162 and may include other RTs (not shown) protected by the same data guard, i.e., data guard 170. As controlled by the second switch 144 and the first switch 142, in the passive mode data traffic from protected RT 160 flows through the first coupler 146 onto transparent bus 152 and then through the third coupler 150, and thence to bus repeater 130 onto the MIL-STD-1553 data bus 102.

Also in the passive mode, the data guard 170 may monitor and log the data traffic from MIL-STD-1553 data bus 102 by way of the bus monitor ("BM") 164, where the data traffic is transmitted to the data guard 170 over MIL-STD-1553 data bus segments 102a and 102b by way of the third coupler 150.

Figure 2B:
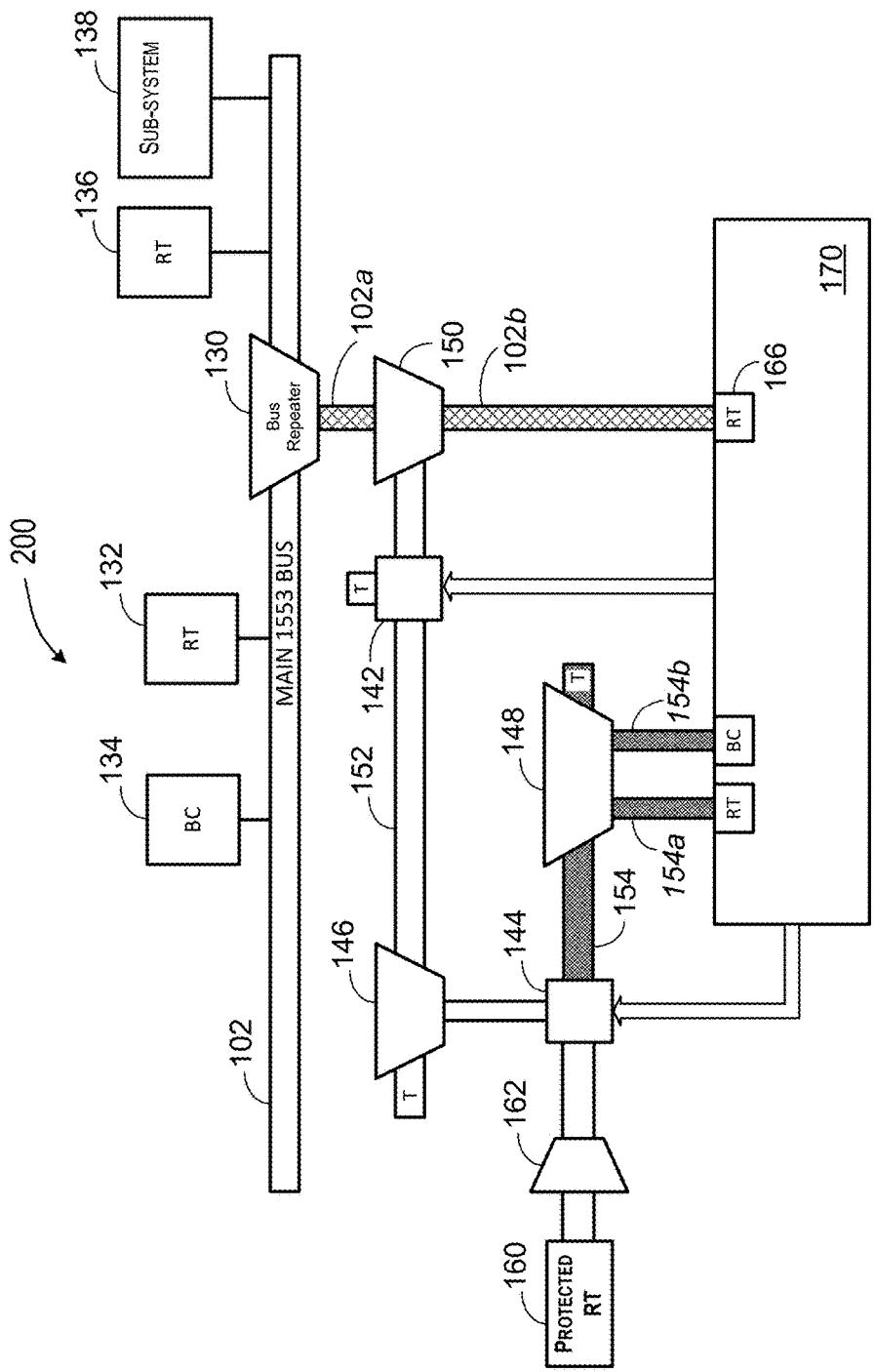
FIG. 2B shows a simplified block diagram of the data guard system of FIG. 1A in the active mode.

FIG. 2B shows a simplified block diagram of the data guard system of FIG. 1A in the active mode. In FIG. 2B, the second switch 144 directs data traffic from protected RT 160 directly onto guarded bus 154 and then through the second coupler 148 into the data guard 170 by way of guarded bus segment 154a and guarded bus segment 154b. After evaluation and validation of the data traffic by a filter (not shown) of the data guard 170, it is transmitted to the MIL-STD-1553 data bus segment 102a and data bus segment 102b by way of the third coupler 150. Also in the active mode, data traffic from the MIL-STD-1553 data bus 102, for example, a BC-RT command from BC 134, may be transmitted by way of the third coupler 150 and MIL-STD-1553 data bus segments 102a and 102b to RT 166 in data guard 170. In the data guard 170, the command message is processed by a filter (not shown). In the active mode, the first switch 142 blocks the data traffic from the transparent bus 152.

Figure 3:
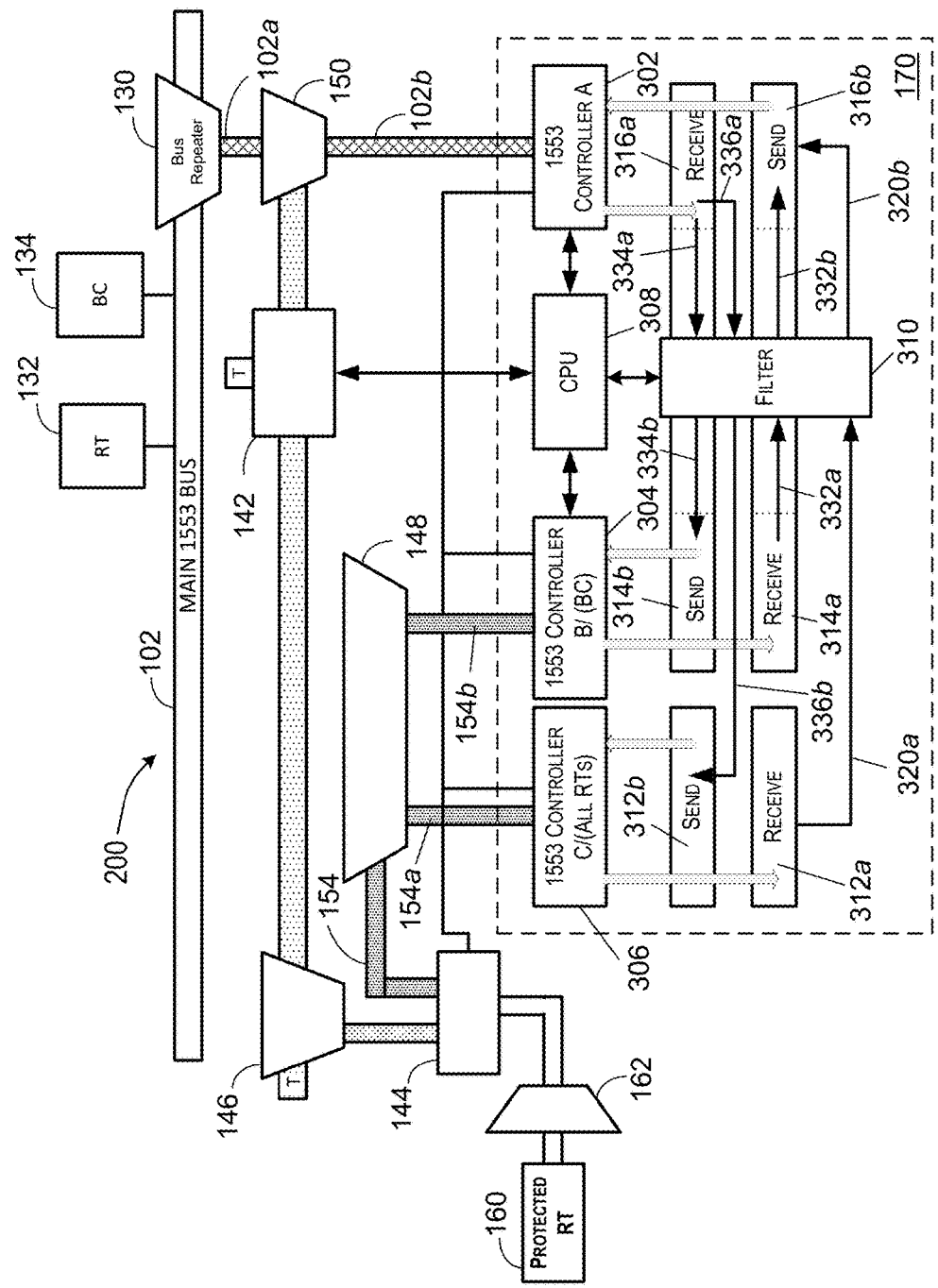
FIG. 3 shows a block diagram of an example of an implementation of a data guard system and a data guard in accordance with the present disclosure.

FIG. 3 shows a block diagram of an example of a data guard system and a data guard in accordance the present disclosure. In FIG. 3, protected RT 160 is connected to the data guard system 200 by way of triaxial connector 162. In the active mode, as controlled by second switch 144, second switch 144 directs data traffic from protected RT 160 directly onto guarded bus 154 and then through the second coupler 148 into the data guard 170 by way of either of two guarded bus segments 154a and 154b. Guarded bus segment 154a and guarded bus segment 154b are connected to 1553 Controller C 306 and 1553 Controller B 304, respectively, which provide execution of direct copy operations of 1553 messages on the guarded bus 154 directly into memory blocks of a plurality of memory blocks of the data guard 170. Specifically, 1553 Controller C 306 is configured to process RT-RT messages and 1553 Controller B 304 is configured to process RT-BC and BC-RT messages from the MIL-STD-1553 data bus 102.

In an example of a method of operation, 1553 Controller C 306 copies an RT-RT message directly to memory block 312a, which RT-RT message is then sent to filter 310 for processing by way of signal path 320a. Once received at filter 310, the RT-RT message will be processed through the data rule sets of the filter 310 by the CPU 308. If the RT-RT message is authenticated by the filter 310, i.e., matches at least one of the data rules of the data rule sets of the filter 310 and there are no other violations, CPU 308 will direct the filter 310 to copy the RT-RT message directly to memory block 316b by way of signal path 320b. From memory block 316b, 1553 Controller A 302 will copy the RT-RT message directly onto MIL-STD-1553 data bus segment 102b, and thence to bus repeater 130 by way of the third coupler 150. In the event that the RT-RT message is not authenticated by the filter 310, the CPU 308 will block the message, and may audit the message and/or notify the user of the error/conflict.

RT-BC messages are handled in a similar fashion through 1553 Controller B 304, which copies RT-BC messages directly to memory block 314a, which RT-BC messages are then sent to filter 310 for processing over signal path 332a. Once received at filter 310, the RT-BC messages will be processed through the data rule sets of the filter 310 by the CPU 308. If the RT-BC messages are authenticated by the filter 310, i.e., match at least one data rule of the data rule sets of the filter 310 and if there are no other violations, 1553 Controller B 304 will direct the filter 310 to copy the RT-BC messages directly to memory block 316b by way of signal path 332b. From memory block 316b, the RT-BC messages will be buffered in the data guard 170 until requested to be sent out by BC 134, whereupon 1553 Controller A 302 will copy the RT-BC message directly onto MIL-STD-1553 data bus segment 102b, and thence to bus repeater 130 by way of the third coupler 150.

The 1553 messages that are received from the MIL-STD-1553 data bus 102 are handled in a similar fashion through 1553 Controller A 302, which copies BC-RT/RT-BC/RT-RT messages directly to memory block 316a, which 1553 messages are then sent to filter 310 for processing over signal path 334a or 336a, and then after processing by the filter 310, to either memory block 314b by way of signal path 334b, or memory block 312b by way of signal path 336b, From memory block 312b, 1553 Controller C 306 will copy the 1553 message directly onto guarded bus segment 154a, and thence to protected RT 160 by way of the second coupler 148. Likewise, from memory block 314b, 1553 Controller B 304 will copy the 1553 message directly onto guarded bus segment 154b, and thence to protected RT 160 by way of the second coupler 148.

FIG. 4 shows an example of a schematic diagram of a table containing data settings for each data guard of a data guard system in accordance the present disclosure. In FIG. 4, a table 400 is shown with two data entries, 418 and 420 for Guard1 and Guard2, respectively. In table 400 of FIG. 4, Guard Settings column 402 is a column containing a list of the data guards that have been designated and configured for use in a data guard system in accordance with the present disclosure. In this example, there are two such data guards, designated as Guard1 and Guard2. In a MIL-STD-1553 data bus system, the maximum of number of remote terminals that can be supported is thirty-one, because one is reserved as a broadcast address. Main RT column 404 contains a unique five-bit hardwired terminal address assigned to each data guard in Guard Settings column 402, in this instance, Guard1 and Guard2.

Column RTs 406 contains additional RT addresses of remote terminals that may be assigned to a specific data guard by the GUI tool. These are virtual addresses that create in effect a protected payload RT comprising multiple RTs all protected by the same data guard. For example, if one five-bit terminal address is entered into the first row of Main RT column 404 and three five-bit terminal addresses are entered into the first row of RTs column 406, and one five-bit terminal address is entered into the second row of Main RT 404 column, this would mean that the MIL-STD-1553 data bus system would have two data guards, one with three associated RTs and the second with one associated RT, for a total of five designated RTs. Accordingly, this would leave twenty-six RTs remaining for connection to the MIL-STD-1553 data bus system, and with one or more of these RTs available as an additional data guard if so designated.

Bus Monitor column 408 specifies which data guard will be tasked with monitoring bus status, with only one data guard being initially designated. Guard Monitor column 410 specifies whether the data guard will provide traffic status, i.e., will report statistics related to operation of the MIL-STD-1553 data bus system. The next three columns allow a system administrator to set audit and capture policies at the data guard level. Forced Message Audit 412 is a column that allows a user to direct the data guard to audit all data of disallowed messages, even those that are not marked for audit. That is, this guard level designation will override any contrary designation in a data rule set. Data Capture column 414 directs the data guard to capture the data of all disallowed messages, even those that are not marked for audit or capture, and if checked, Allow Good Message Audit column 416 provides custom dynamic audit of specific good messages.

Figure 5:
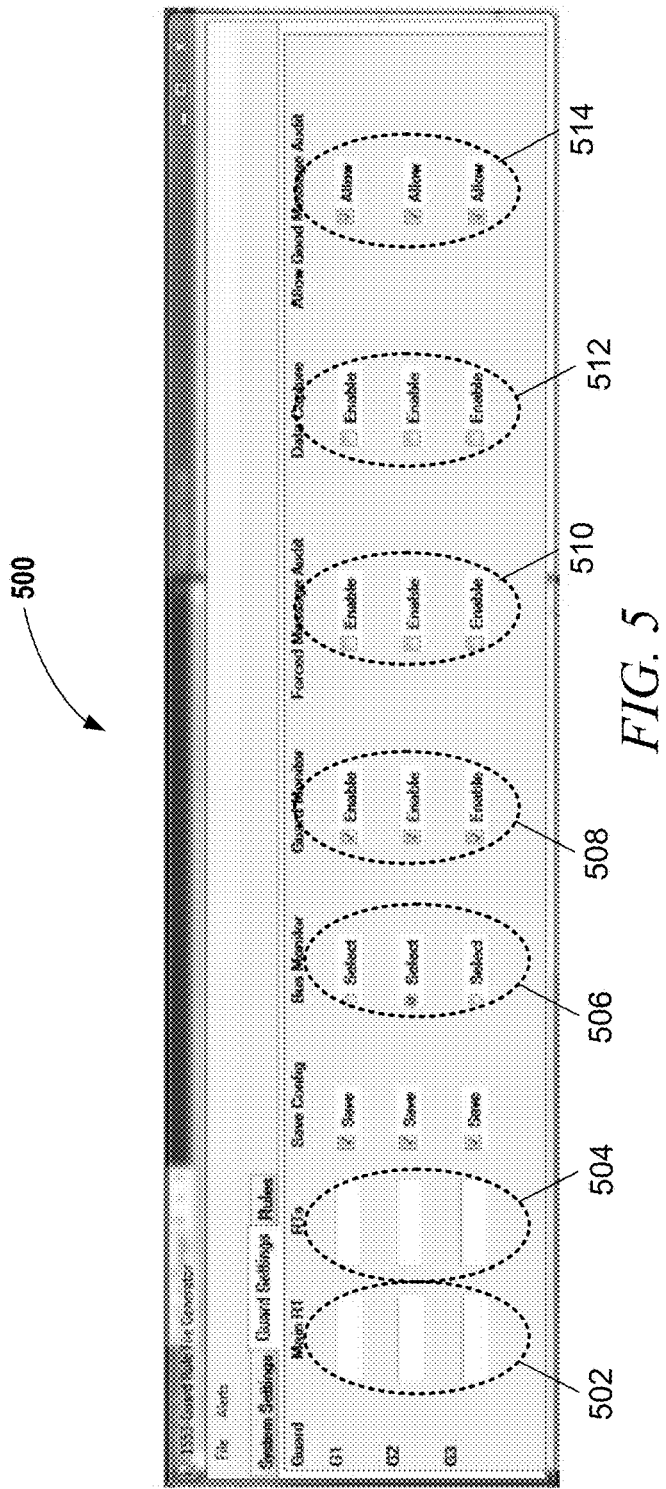
FIG. 5 shows an example of an implementation of a guards setting tab of a graphical user interface (GUI) tool that allows a system administrator of the data guard system in accordance the present disclosure, to configure the data guard system and its data guards.

Turning to FIG. 5, an example of an implementation of a guards setting tab 500 of a graphical user interface (GUI) tool that allows a system administrator of a data guard system in accordance with the present disclosure, to configure the data guards of a data guard system and their relationships to other RTs connected to the data guard system. In general, a Systems Setting tab of the GUI tool allows the system administrator to set certain parameters for data guards at the system level, and the guards setting tab 500 allows the system administrator to set certain parameters for a main data guard as well as associated RTs. Columns 502 and 504 contain text fields that allow a system administrator to enter the terminal address assigned to the main data guard in each data guard system and the additional terminal addresses of remote terminals that may be assigned to the data guard, respectively. The remaining columns 506, 508, 510, 512, and 514 contain check boxes that allow a system administrator to select a bus monitor, enable a guard monitor, enable forced message audit, enable data capture, and allow good message audit, respectively.

Thus, using the guards setting tab 500 of FIG. 5, a user may create a desired data guard system with one or more RTs (which may be referred to as protected RTs) associated with a specific data guard, where each data guard may be customized as to threat level and data audit and capture policies. In this type of embodiment, the protected RTs may be connected directly to their assigned data guard by way of a triaxial connector, while in other embodiments, a data guard may be connected to a bus repeater inserted into a 1553 data bus system, which gives the data guard access to all RTs connected to the 1553 data bus system.

In general, after the data guard system and all its associated data guards have been defined and configured, the system administrator can then proceed to define the data rule sets that govern each data guard's operation. FIG. 6 shows an example of a schematic diagram of a table 600 containing data settings for each data guard of a data guard system in accordance the present disclosure, which table 600 may be stored in the filter 310 of data guard 170 shown in FIG. 3. In this example, the table 600 may be separated into several sections. The First Section 602 includes a Rule Number 604 column that corresponds to a unique rule number for each data rule in the table 600. In general, the Rule Number 604 column lists the rule number for each of the different data rules that have been established by a system administrator in a table of the filter 310 of data guard 170 (FIG. 3). The data rules may be consecutively numbered in the Rule Number 604 column from, for example, rule 1-611, rule 2-612, to rule 3-613. It is appreciated by those of ordinary skill in the art that in this example only three data rules (i.e., rule 1-611, rule 2-612, and rule 3-613) are shown for the convenience of illustration but that the table may also include any plurality of data rules greater than three.

The First Section 602 also includes a Local Guard (LG) 614 column that specifies to which data guard the data rule applies, and generally the specified data guard should be associated with at least one of the RT addresses in the Second Section 606, i.e., RT sub-sub-section 626 or RT sub-sub-section 634. The inputs to this column may be one of the data guards input into the data guard system by way of the guards setting tab of FIG. 5, and preferably the five-bit RT addresses of the data guards may be available in the form of a drop-down menu.

In this example, the Second Section 606 of the table 600 has columns that correspond to the different types of command words, i.e., words that specify what function a remote terminal is to perform, that are received over the MIL-STD-1553 data bus 102. In this example, the Direction 616 column shows whether the rule pertains to an inbound 1553 message or an outbound 1553 message (always from the point of view of the remote terminal), and the Command Word Type 618 column represents the command word type, which types may be one of the following: RT-RT, RT-BC, BC-RT, Mode, and RT-X-RT, and the Threat Level 620 column represents the threat level (TL) that pertains to the data rule set. The inputted TL values may be lists, ranges, or single values, and have to have been previously defined at the system level.

Related to the command words of the 1553 message, the First RT Command 622 columns relate to the RT address of the first command word of an associated transaction that the data guard will see on the data bus, and may include four sub-fields: an RT sub-sub-section 626, which is a 5-bit terminal address of the RT for which the command word is intended, a transmit/receive ("T/R") sub-sub-section 628, a sub-address section ("SB") 630, and a Word Count ("WC") sub-sub-section 632. The Second RT Command 624 columns, which relate to the second RT address of the second command word of an associated transaction that the data guard will see, may also include an RT sub-sub-section 634, T/R sub-sub-section 636, SB sub-sub-section 638, and WC sub-sub-section 640. In the case of an RT-RT transfer where both RTs are protected by the same data guard, this will be a RT-X-RT command word type and the Direction 616 column will be marked with an "X." The Rule Threat Level 620 column is the TL of the data rule that is compared to the system-level TL or device-specific TL of a data guard as determined by the system administrator of the data guard system.

Turning to the Third Section 608, the Audit at Fourth Section Violations 648 column is a flag (marked YES or NO) that indicates whether or not a 1553 message will be audited when there is an event or discrepancy related to the caching columns 652-658 of the Fourth Section 610 applied to the caching of the 1553 message or an event related to or resulting from Deep Inspection 660 columns applied to the 1553 message. Likewise, the Audit Data Capture 650 column is a flag (marked YES or NO) that indicates whether or not the data of a 1553 message is included in an audit log regardless of any message mismatches.

Columns 652 to 658 of the Fourth Section 610 relate to caching outbound 1553 messages, where the Type 654 column indicates one of three types of caching: sequential, overwrite/underwrite, and no caching. The Update 558 column should contain a single numerical value that indicates how often the data guard re-caches the data, i.e., overwrites stale data with fresh, and the Expiration 656 column is also a single numerical value that indicates the maximum amount of time data stored in transfer buffers may be considered valid. As for the FIFO 652 column, this sub-field specifies the size of the transfer buffer required for caching the specified transaction. The size of the transfer buffer may be determined by the larger Word Count of the WC 632 column and the WC 640 column. A FIFO event occurs, as an example, whenever there is a mismatch between the word count and the words read out of the caching buffer, i.e., an overwrite or underwrite.

As for the YES/NO 662 column and the Values 664 column, these relate to deep packet inspection by the data guard of data words of the 1553 messages. The YES/NO 662 column contains a flag (marked YES or NO) that indicates whether or not the data of a 1553 message will be deep packet inspected. The Values 664 column is a field that will display the deep packet inspection settings when clicked. In this particular embodiment, the deep inspection settings may be inputted using values input by the System Administrator using the Tab 702 of the GUI tool (see FIG. 7). The deep inspection values may include multiple elements with different values, which may be single values or a range of values, and these values may replace values in the data words or may be used to validate certain data in the data words, such as, for example, a range of values received from sensors.

As for operation of a data guard, in general, the Second Section 606 is analogous to an index or look-up table in that when 1553 messages are received at the data guard 170, the Second Section 606 is utilized to compare the 1553 messages received from the 1553 data bus against each of the data rule sets 642, 644, and 646 stored in the table 600 that are identified by the corresponding rule numbers (rule 1-611, rule 2-612, and rule 3-613, respectively), until a match is made. These data rules (as listed in the First Section 602) will either be applied or not applied based on whether the received message matches a corresponding data rule. These data rules themselves may be numerical values, a list of values, a range of values, or "wild cards." As an example, the data rules may include a wild card rule that defines a rule that is utilized for all threat levels or selected threat levels. For example, a wild card rule may define utilizing a rule for threat levels one through three but not for threat levels four and five.

In this example, if the CPU 308 (from FIG. 3) determines a match between a 1553 message and the parameters of the Second Section 606 of a data rule set, for example, rule 1-611 with Data Rule 642, if the Audit at Fourth Section Violations 648 column has been checked, the CPU 308 then applies the parameters of the Fourth Section 610 of the data set rule to the 1553 message to determine if the caching of the 1553 message has generated an event or discrepancy related to the caching and deep packet inspection parameters of the Fourth Section 610. This Third Section 608 may also include an Audit Data Capture 650 column, which if checked, will cause an audit of the data words of the 1553 message to be included in the audit log for this data message, which may be stored in a memory of the data guard 170 so that it may be analyzed later.

In an example of operation, in general, if the 1553 message matches at least one data rule of the data rule sets of table 600, then that 1553 message will be allowed through the data guard. However, the system administrator may nonetheless chose to audit the 1553 message by checking the Audit Data Capture 650 column in the data rule. Also, the data guard system provides for various types of auditing and data capture related to caching and deep packet inspection as determined by parameters set in the data rule.

The Deep Inspection 660 columns may include the YES/NO 662 column and the Values 664 column. The YES/NO 662 column is utilized to determine whether the CPU 308 should perform a deep packet inspection of the data in the data words of the 1553 message. If a deep packet inspection is performed, the CPU 308 may utilize the individual values found in the drop-down menu of Values 664 column. Examples of the values in the Values 664 column may include a validate value, replace value, etc., which may be input by a system administrator using text box 750 of FIG. 7.

Figure 7:
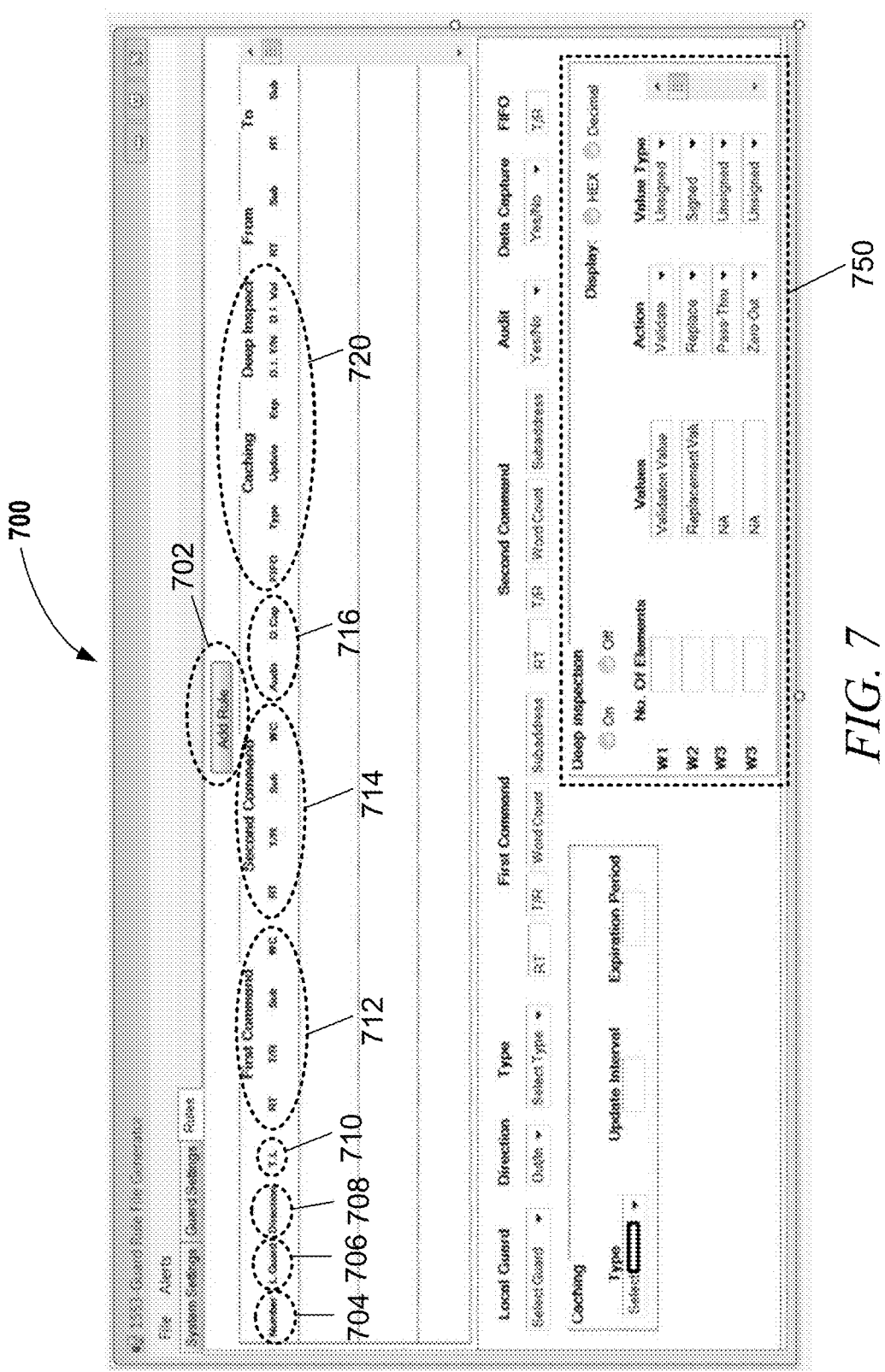
FIG. 7 shows an example of an implementation of a rules tab of the GUI tool of FIG. 4 that allows a system administrator to create, edit, and maintain data rule sets in a rule table of a filter of the data guard shown in FIG. 3.

FIG. 7 shows an example of an implementation of a rules tab of the GUI tool of FIG. 5 to create, edit, and maintain data rule sets stored in a rule table 700 of a filter 310 of the data guard 170 shown in FIG. 3 that enables a system administrator to configure a data rule set for a data guard. In FIG. 7, tab 702 allows the system administrator to select a rules tab in order to configure a data rule of a data rule set. Columns 704, 706, 708, and 710 correspond to the Rule Number 604 column, the Local Guard (LG) 614 column, the Direction 616 column, and the Rule Threat Level 620 column of FIG. 6, respectively. Columns 712 and 714 correspond to the First RT Command 622 columns and the Second RT Command 624 columns of FIG. 6, respectively.

Audit/Capture 716 Column includes check boxes to set the parameters of the Audit at Fourth Section Violations 648 column and the Audit Data Capture 650 column, respectively, of FIG. 6. Caching/Deep Inspection 720 Column includes check boxes and text fields to set the parameters for caching and deep packet inspection, with text box 750 containing text fields that allow the system administrator to input the values that are used to validate or replace data of the data words of a 1553 command. Thus, using the tab 702 of FIG. 7, a system administrator may pre-define each data rule for a data rule set to be used in a filter 310 of a data guard system.

Figure 8:
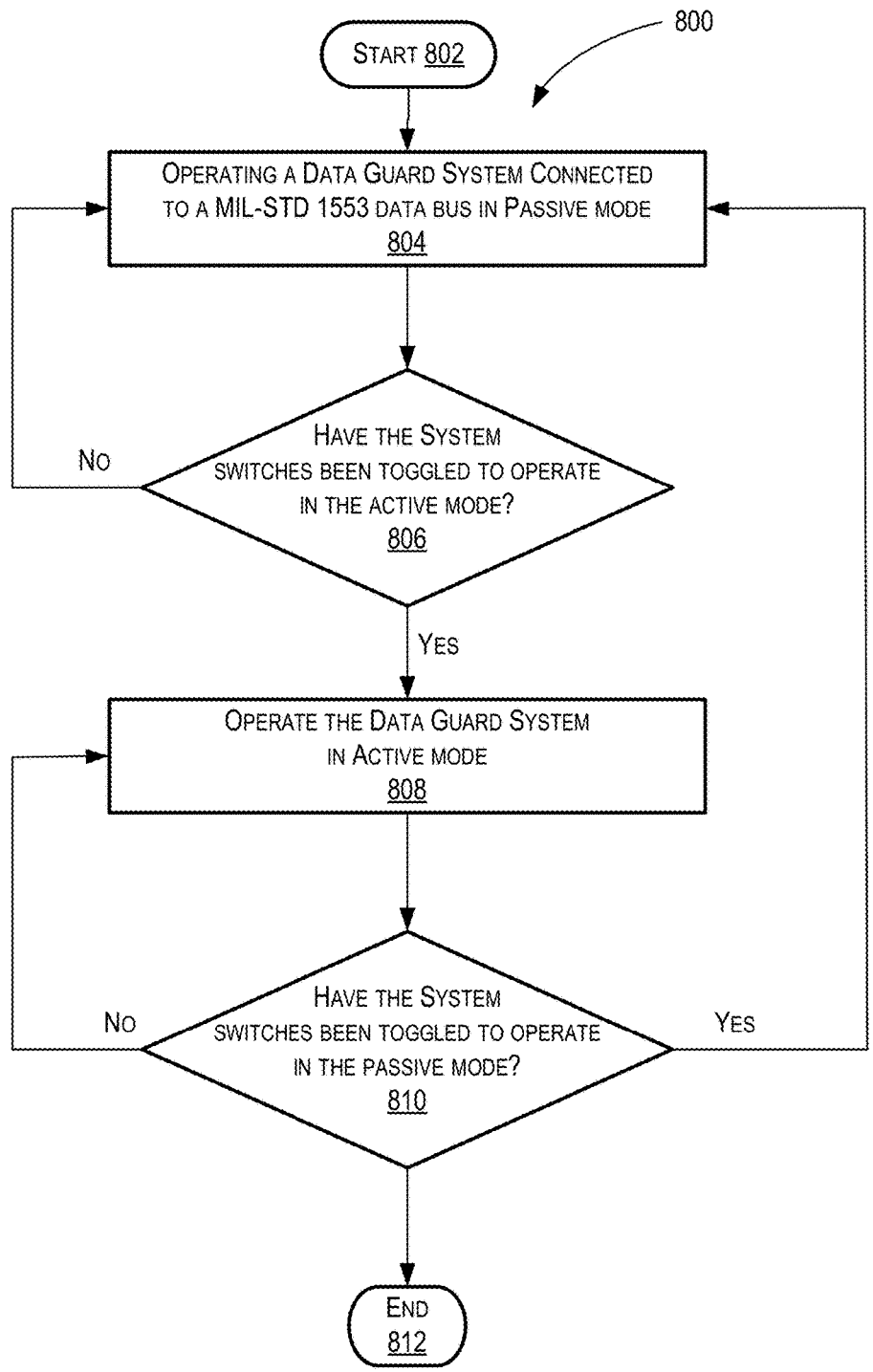
FIG. 8 shows a flow diagram of one example of a method of operating a data guard system in accordance the present disclosure, whereby data traffic from a remote terminal connected to a MIL-STD-1553 data bus is evaluated and authenticated by a data guard of the data guard system, and based on the evaluation, is either passed through the data guard or blocked from passing.

FIG. 8 shows a flow diagram of one example of a method of operating a data guard system in accordance the present disclosure, whereby data traffic from a remote terminal connected to a MIL-STD-1553 data bus is evaluated and authenticated by a data guard of the data guard system. The method 800 starts at step 802, and in step 804, the data guard system is operating in the passive mode, meaning that data traffic from the MIL-STD-1553 data bus is being directed to a transparent bus of the data guard system. In decision step

806, the data guard system determines if the two switches, first switch 142 and second switch 144 (FIG. 1), of the data guard system have been toggled to enter the active mode or if the system has received a command instructing it to enter the active mode.

If the two switches have been toggled or an activation command received, the data guard system proceeds to step 808 where the data guard system begins operating in the active mode, whereby data traffic from the MIL-STD-1553 data bus is directed onto a guarded bus of the data guard system and evaluated and authenticated by being passed through a filter of the data guard system. In decision step 810, the data guard system determines if first switches 142 and second switch 144 (FIG. 1) have been toggled back to the passive mode or if a passive mode command has been received. If not, the process returns to step 808 and continues operating in the active mode. Otherwise, the process returns to step 804 and begins operating in the passive mode. The process ends in step 812.

Returning to FIG. 3, another example of a method of operating a data guard system in accordance with the present disclosure may be illustrated. In this example, protected RT 160 may be a weapons system on an aircraft, comprising one or more "smart" weapons or conventional weapons attached to a wing pylon of the aircraft. RT 132 may be a microprocessor and related sub-systems within the aircraft that are in signal communication with each weapons system of the aircraft, including protected RT 160 and its sub-systems (not shown). RT 132 is responsive to pilot commands that enable the pilot or other crew members to monitor the status of the protected RT 160, to prepare for the launching of its weapons, and then execute launching the weapons of protected RT 160.

As noted earlier, only an active BC may originate and transmit command words on the conventional 1553 data bus, and in this example, BC 134 is that active bus controller. In this example of operation, it may begin with RT 132 determining the status of all weapons systems it controls. One method of accomplishing this is to have BC 134 broadcast to all RTs on the 1553 data bus a request for a status update, and when responses to these requests are received, communicating these results to RT 132.

If at this point, as an example, if the pilot of the aircraft wished to activate the weapons system related to RT 132, he would generate a 1553 message to BC 134 to implement this request, which would be received at 1553 controller A 302 of data guard 170. The date guard system for monitoring data traffic on a MIL-STD-1553 data bus system of the disclosure is configurable, and thus upon initialization, a system administrator would have generated the settings for each data guard in the system, including its device-specific threat level (TL). The data guard system may also be assigned a universal, system wide TL, which would govern if a data guard were not assigned its own TL. Each data rule may also be assigned a TL. Once configured, TLs may be modified by a system administrator changing the TL of the data guard through a BC using a mode command either remotely or from within the aircraft.

As an example, the threat level (TL) for data guard 170 may be relatively high, say TL=5, because it is RTs relate to weapons systems. If operational conditions change, a system administrator may change the TL, for example, from 5 to 3. This does not change any TLs in the data rule sets of the filter 310, but only those data rules with a TL of 3 will be applied to 1553 messages being filtered by the data guard.

While the foregoing implementations of the present disclosure are described in use in commercial aircraft structures, the present disclosure may also apply to military aircraft, spacecraft, missile systems, commercial structures, and other applications where push-pull circuit breakers are used to power equipment, circuits, or machines. In general, terms such as "attached to," "coupled to," and "configured for coupling to" and "secured to" (for example, a first component is "coupled to" or "is configured for coupling to" or is "secured to" a second component), or "communicate" (for example, a first component "communicates with" or "is in communication with" a second component) are used in this application to indicate a structural, functional, mechanical, electrical, signal, optical, magnetic, electromagnetic, ionic or fluidic relationship between two or more components (or elements, features, or the like). As such, the fact that one component is said to couple to a second component is not intended to exclude the possibility that additional components may be present between, and/or operatively associated or engaged with, the first and second components.

It is appreciated by those skilled in the art that the circuits, components, modules, and/or devices of, or associated with, the MIL-STD-1553 data bus 102 are described as being in signal communication with each other, where signal communication refers to any type of communication and/or connection between the circuits, components, modules, and/ or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

It is further appreciated by those of ordinary skill in the art that one or more 1553 controllers that include controller A 302, controller B 304, and controller A 306 shown in the Data Guard 170 and the CPU 308, respectively, may operate in a cluster or other grouped configuration to share resources, balance load, increase performance, provide failover support or redundancy, or for other purposes. In general, the one or more 1553 controllers 302, 304, and 306 shown in the Data Guard 170 and the CPU 308, respectively, may be computing devices that belong to a variety of classes of devices, which may be the same as, or different from each other. Examples of the computing devices include client-type devices, payload systems with computing devices, controllers, and special purpose-type devices. More specifically, the one or more 1553 controllers 302, 304, and 306 shown in the Data Guard 170 and the CPU 308, respectively, may represent, for example, a Central Processing Unit ("CPU") type processing unit, a Graphics Processing Unit ("GPU") type processing unit, a Field-programmable Gate Array ("FPGA"), another class of Digital Signal Processor ("DSP"), other hardware logic components that may, in some instances, be driven by a CPU, or combination of these computing devices. For example, and without limitation, examples of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, a computer-readable media may store instructions executable by the one or more 1553 controllers 302, 304, and 306 and the CPU 308. The computer-readable media may also store instructions executable by external processing units such as by an external CPU, an external GPU, and/or executable by an external accelerator, such as an FPGA type accelerator, a DSP type accelerator, or any other internal or external accelerator. In some examples, at least one CPU, GPU, and/or accelerator may be incorporated in the Data Guard 170, while in some examples one or more of a CPU, GPU, and/or accelerator may be external to the Data Guard 170.

In this disclosure, the computer-readable media may include computer storage media and/or communication media, which may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, the computer storage media may include tangible and/or physical forms of media included in the data guard 170 and/or hardware component that is part of the data guard 170 or is external to the data guard 170, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In this example, the computer-readable media may include data storage such as, for example, a database, data warehouse, or other type of structured or unstructured data storage. Additionally, the data storage may include a corpus and/or a relational database with one or more tables, indices, stored procedures, and so forth to enable data access including one or more of hypertext markup language ("HTML") tables, resource description framework ("RDF") tables, web ontology language ("OWL") tables, and/or XML tables, for example. Moreover, the data storage may also store data for the operations of processes, applications, components, and/or modules stored in computer-readable media and/or executed by one or more processing units and/or accelerator(s). Furthermore, each computer-readable media may also include an operating system and application programming interface(s) configured to expose the functionality and the received data of the data guard 170 to external devices (not shown) associated with the data guard 170. Additionally, the computer-readable media may include one or more modules such as a server module (not shown) and an output module (not shown), although this number of modules is just an example, and the number may vary higher or lower because the functionality described in this disclosure may be performed by a fewer number of modules or a larger number of modules on one device (such as, for example, the data guard 170 or spread across multiple devices.

Although the previous description only illustrates particular examples of various implementations, the present disclosure is not limited to the foregoing illustrative examples. A person skilled in the art is aware that the disclosure as defined by the appended claims can be applied in various further implementations and modifications. In particular, a combination of the various features of the described implementations is possible, as far as these features are not in contradiction with each other. Accordingly, the foregoing description of implementations has been presented for purposes of illustration and description. Modifications and variations are possible in light of the above description.

What is claimed is:

1. A data guard system for use with an MIL-STD 1553 data bus, the data guard system comprising:
    a first coupler;
    a second coupler;
    a third coupler;
    a first switch communicatively couple to the third coupler;
    a second switch, the second switch communicatively coupled to the first switch via the first coupler;
    a guarded bus in signal communication with the second coupler and the second switch; and
    a data guard communicatively coupled to the second coupler, the data guard comprising:
        a first 1553 controller in signal communication with the second coupler;
        a filter that includes a plurality of pre-generated data set rules configured to be applied to data traffic messages received from the MIL-STD 1553 data bus;
        a plurality of direct memory blocks accessible to the first 1553 controller;
        a microprocessor in signal communication with first switch, the second switch, the first 1553 controller, and the filter, wherein a plurality of data traffic messages from a remote terminal connected to the second switch is, responsive to the data guard system being in an active mode, directed by the second switch onto the guarded bus and then to the second coupler, and wherein a data traffic message of the plurality of data traffic messages is compared against the plurality of pre-generated data rule sets to determine whether the data traffic message matches at least one data rule of the pre-generated data rule sets; and
        a second 1553 controller in signal communication with the second coupler;
        a third 1553 controller in signal communication with the second coupler, wherein the second 1553 controller and the third 1553 controller are configured to send data messages from the guarded bus directly into memory blocks of a plurality of memory blocks of the data guard and receive data messages directly from memory blocks of a plurality of memory blocks as directed by the microprocessor.

2. The data guard system of claim 1, further including comprising:
    a transparent bus in signal communication with the first switch, the second switch, the first coupler, and the third coupler, wherein the plurality of data traffic messages from the remote terminal, using the second switch, is directed onto the transparent bus responsive to the data guard system being in a passive mode, the plurality of data traffic messages sent to the transparent bus via the third coupler using the first switch, wherein data traffic from the remote terminal is sent by way of the first coupler to the MIL-STD 1553 data bus.

3. The data guard system of claim 2, wherein the data guard system is toggled between the active mode and the passive mode by signals received from a bus controller of the data guard system.

4. The data guard system of claim 3, further comprising:
a first stub cable connecting a bus repeater with a fourth coupler; and
a second stub cable connecting the fourth coupler with a remote terminal configured to act as a bus monitor for the data guard system and extract selected information form the data guard.

5. The data guard system of claim 3, further comprising:
a triaxial connector in signal communication with the second switch;
a stub cable in signal communication with the triaxial connector; and
a remote terminal connected to the stub cable.

6. The data guard system of claim 3, further comprising a graphics user interface tool that allows a system administrator to configure data guards of the data guard system and the data rule sets of the filter of the data guards.

7. The data guard system of claim 1, wherein the first coupler comprises a first transformer coupler, wherein the second coupler comprises a second transformer coupler, and wherein the third coupler comprises a third transformer coupler.

8. The data guard system of claim 1, wherein the data guard is configured to transmit the data traffic message to the first coupler responsive to the data traffic message matching the at least one data rule of the pre-generated data rule sets.

9. The data guard system of claim 1, wherein the data guard further comprises a fourth 1553 controller in signal communication with the third coupler, wherein the fourth 1553 controller is configured to send data messages directly from the MIL-STD 1553 data bus by way of the third coupler to memory blocks of a plurality of memory blocks of the data guard and to send data messages directly from memory blocks of a plurality of memory blocks of the data guard to the MIL-STD 1553 data bus by way of the third coupler as directed by the microprocessor.

10. The data guard system of claim 1, further comprising a bus repeater in signal communication with the first coupler, wherein the bus repeater is inserted into the MIL-STD 1553 data bus.

11. The data guard system of claim 10, wherein a protected payload remote terminal (RT) is connected to the data guard by way of a triaxial connector connected to the second switch.

12. The data guard system of claim 11, wherein the protected payload RT includes one or more associated RTs that are protected by the data guard.

13. A method of validating data traffic on an MIL-STD 1553 data bus with a data guard toggleable into an active mode and a passive mode, the method comprising:
receiving the data traffic from the MIL-STD 1553 data bus in signal communication with the data guard;
directing the data traffic onto a transparent bus or a guarded bus of the data guard using a first switch and a second switch;
responsive to the data traffic being directed onto the guarded bus:
accessing a data rule set from a computer file stored on a computer-readable medium stored on the data guard, wherein the data rule set includes a plurality of defined sub-rules;
comparing the data traffic from the MIL-STD 1553 data bus against each of the defined sub-rules of the data rule set; and
determining whether the data traffic matches any one of the plurality of defined sub-rules of the data rule set;
configuring the data guard using a graphical user interface tool that allows a system administrator to pre-generate the data rule sets of a filter of the data guard and to associate one more remote terminals with the data guard.

14. The method of claim 13, if further comprising, responsive to the data traffic being directed onto the transparent bus, directing the data traffic back onto the MIL-STD 1553 data bus.

15. The method of claim 14, further comprising:
responsive to a determination that the data traffic matches any one of the plurality of defined sub-rules of the data rule set, directing the data traffic to an original destination.

16. The method of claim 15, further comprising:
responsive to a determination that the data traffic does not match one any of the plurality of defined sub-rules of the data rule set,
analyzing the data traffic that has been determined to be a mismatch in relation to the data rule set,
blocking the data traffic from passing through the data guard, and
notifying a user of violation a sub-rule of the data rule set.

17. The method of claim 16, further comprising toggling the data guard between an active mode wherein the data traffic is compared against each of the defined sub-rules of the data rule set and a passive mode wherein the data traffic bypasses the data guard.

18. The method of claim 13, wherein the data guard comprises a first transformer coupler, a second transformer coupler, and a third transformer coupler.

19. A data guard for configured to evaluate and authenticate data traffic on an MIL-STD 1553 data bus, the data guard comprising:
a first coupler;
a second coupler;
a third coupler;
a first switch;
a second switch;
a guarded bus in signal communication with the second coupler and the second switch;
a first 1553 controller in signal communication with the second coupler;
a filter that includes a plurality of pre-generated data rule sets configured to be applied to data traffic messages received from the MIL-STD 1553 data bus;
a plurality of direct memory blocks accessible to the first 1553 controller; and
a microprocessor in signal communication with first switch, the second switch, the first 1553 controller, and the filter, wherein a plurality of data traffic messages from a remote terminal in signal communication with the second switch is, responsive to the data guard being in an active mode, directed by the second switch onto the guarded bus and then to the second coupler, and wherein a data traffic message of the plurality of data traffic messages is compared against the plurality of pre-generated data rule sets to determine if whether the data traffic message matches at least one of the pre-generated data rule sets; and
a second 1553 controller in signal communication with the second coupler;

a third 1553 controller in signal communication with the second coupler, wherein the second 1553 controller and the third 1553 controller are configured to send data messages from the guarded bus directly into memory blocks of a plurality of memory blocks of the data guard and receive data messages directly from memory blocks of a plurality of memory blocks as directed by the microprocessor.

20. The data guard of claim 19, wherein the data guard is toggled to a passive mode by signals sent to the first switch and the second switch by a bus controller on the MIL-STD 1553 data bus.

* * * * *

UNITED STATES PATENT AND TRADEMARK OFFICE
CERTIFICATE OF CORRECTION

PATENT NO. : 10,467,174 B2
APPLICATION NO. : 15/493022
DATED : November 5, 2019
INVENTOR(S) : Josh D. Eckhardt et al.

Page 1 of 1

It is certified that error appears in the above-identified patent and that said Letters Patent is hereby corrected as shown below:

Column 16 Line 11, Claim 14, after "claim 13," delete "if".

Column 16 Line 63, Claim 19, after "to determine" delete "if".

Signed and Sealed this
Twenty-first Day of January, 2020

Andrei Iancu
*Director of the United States Patent and Trademark Office*